United States Patent [19]

Gabry et al.

[11] Patent Number: 4,459,437

[45] Date of Patent: Jul. 10, 1984

[54] TEST SYSTEM FOR LOCATING BREAKS AND SHORT CIRCUITS IN A TWO-LEAD LINE

[76] Inventors: André C. Gabry, 56, rue de Fontenay, Le-Plessis-Robinson, France, 92350; Louis V. Gibault, 132, av. du Général de Gaulle, Issy-Les-Moulineaux, France, 92130; Denis H. Landrea, 14A, rue Paul Couderc, Sceaux, France, 92330

[21] Appl. No.: 339,047

[22] Filed: Jan. 13, 1982

[30] Foreign Application Priority Data

Jan. 21, 1981 [FR] France ................................ 81 01050

[51] Int. Cl.³ .............................................. H04B 3/46
[52] U.S. Cl. ................................ 179/175.3 F; 324/52
[58] Field of Search ................... 179/175.3 F, 175.3 R; 324/51, 52; 340/635, 651, 650, 652

[56] References Cited

U.S. PATENT DOCUMENTS 3,843,848 10/1974 Cox .............................. 179/175.3 R 4,054,759 10/1977 McGrath et al. ............ 179/175.3 R Primary Examiner—Stafford D. Schreyer
Attorney, Agent, or Firm—Lowe, King, Price & Becker

[57] ABSTRACT

The system locates breaks and short circuits in a two-lead line with respect to a test device inserted in the line. At one remote end of the line is an apparatus for selectively applying a voltage and a current. The test device comprises a circuit in parallel with the line leads for transmitting a first frequency signal along the line which modulates the current in response to the applied voltage when no break is existing between the remote apparatus and the test device, and a circuit in series on one of the line leads for transmitting a second frequency signal along the line which modulates the line current in response to the applied current when no short circuit exists between the remote apparatus and the test device. The remote end of the line is selectively connected to first and second frequency detectors. The line can include a subscriber loop including a telephone subscriber installation at the other end.

41 Claims, 4 Drawing Figures

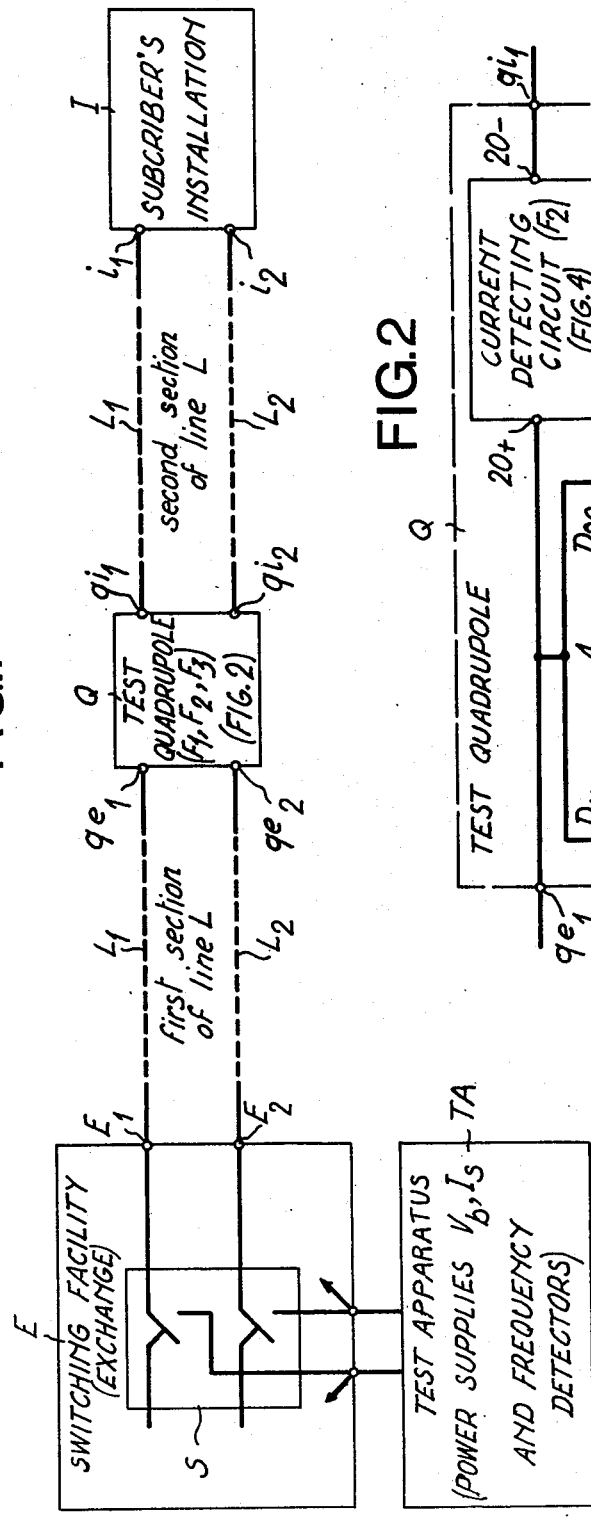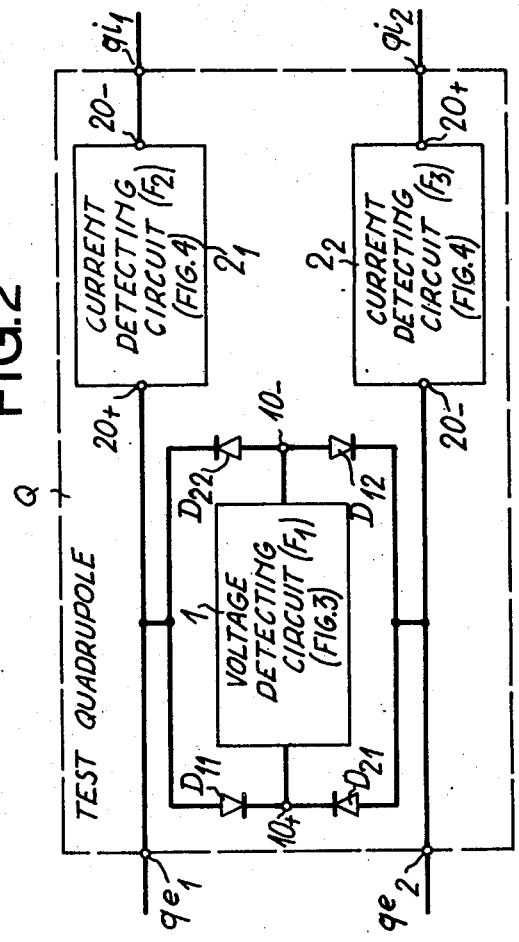

TEST SYSTEM FOR LOCATING BREAKS AND SHORT CIRCUITS IN A TWO-LEAD LINE

BACKGROUND OF THE INVENTION

1. Field of the Invention

The present invention relates to a system for the remote testing of the transmission quality of a two-lead line which, under testing, links a measuring and testing apparatus at one end of the line to a load circuit at the other end of the line. More particularly, the system detects and locates failures in a telephone subscriber two-lead line or loop including a test device or quadrupole and which serves a subscriber installation. The measuring and testing apparatus is selectively connected to the subscriber loop through the respective switching facility or a local telephone exchange.

The line faults localized by the system fall into two types. The first type relates to breakdowns, also referred to as open circuits or cuts-off in one of the line leads. The second type covers short circuits also referred to as loops or shunts having a low resistance between the two-line leads or one of the line leads and ground.

2. Description of the Prior Art

In known test systems a test apparatus for locating line failures includes supply means. After the failures have been detected by a test desk or test rack that any switching facility has, they are located with respect to a test quadrupole. Depending on a response from the quadrupole subjected to the voltage or the current derived by the supply means, the test apparatus enables a fault to be located in the first line section between the switching facility and the test quadrupole or in the second line section between the test quadrupole and the subscriber installation. Generally, the second section is short and the test quadrupole is in the vicinity of the subscriber telephone installation. The location of a fault gives a guide as to whether the maintenance team that will be called upon to repair the line is ascribed to the first telephone line section at the switching facility end or to the second line section at the subscriber installation end. Indeed, the know-how and tooling required for troubleshooting the line or first section and the subscriber telephone installation or second section are most different. The location of a fault, rather than its precise nature, can consequently constitute a decision criterion when it comes to designating the maintenance team to be dispatched.

If an in-line fault is involved, the maintenance team is equipped with ladders and the gear needed to climb down into a chamber or the sewers. Were the fault is located at the subscriber end, then the maintenance team needs an appointment with the subscriber.

U.S. Pat. No. 4,054,759 describes two types of test quadrupoles or test circuits, each of which is interconnected in a two-lead telephone line or subscriber loop.

The first type of quadrupole comprises a relaxation oscillator and a relay first contact, the oscillator and contact are connected in series between the two-line leads. A connection means for connecting the oscillator to the subscriber loop in response to a DC predetermined signal includes the relay and a second relay contact; the relay coil and second contact are connected in series with a diode between the line leads.

The supply means in the remote test apparatus comprises a direct voltage source which is selectively connected to the other terminals of the first line section by two transfer contacts. One of the line leads and one of the terminals of the voltage source are always grounded, which calls for a predetermined bias of the test quadrupole. This requirement can generate quadrupole connection errors harmful to operation of the quadrupole during its insertion in the line. This type of test quadrupole is in fact intended for telephone lines peculiar to certain countries, such as North America, where the subscriber line wires, namely the "tip-wire" or T-wire and the "ring-wire" or R-wire, have a predetermined role and cannot be permutated. Such a test quadrupole cannot thus also be used for those telephone subscriber lines in which the order of the two leads is of little importance, as is the case in the French telephone network.

In the first type of test quadrupole disclosed in U.S. Pat. No. 4,054,759, when the relay is activated with a voltage equal to or greater than the predetermined voltage of the remote supply source, the relay responds by operating its first contact such that the relaxation oscillator is looped across the line between the predetermined supply voltage and ground to modulate the subscriber loop current; simultaneously, the subscriber installation that is linked to the other end of the second line section is disconnected. Detection of the modulation frequency in the remote test apparatus indicates the absence of a break in the first line section.

The second type of test quadrupole according to U.S. Pat. No. 4,054,759 also comprises a relay which controls contacts. The relay is interconnected between a ground terminal and a terminal common to first and second diode circuits having other terminals connected to the line leads respectively. Two relaxation oscillators, included in the test quadrupole, operate at different frequencies. The terminals of each oscillator are linked to said ground terminal and to one of the line leads. Such a quadrupole allows each of the line leads to be tested separately by applying a predetermined voltage at the remote end of the first line section to the respective lead in question. When no break of the considered lead exists the respective relaxation oscillator operates in a well known manner to impart an AC modulation component on the current flowing in said lead. The respective modulation frequency is detected in the remote test position. This second type of test quadrupole therefore requires a ground. The modulation frequency return via the ground has the drawback of producing crosstalk in neighbouring subscriber lines that are contained in a same telephone cable. This drawback is hardly compatible with regular preventive tests in subscriber lines.

However, one of the major drawbacks of test quadrupoles according to U.S. Pat. No. 4,054,759 is that the quadrupoles include a ground terminal and cannot indicate insulation faults in the line, such as short circuits between the two line leads or between one of the leads and ground. Furthermore, the use of relays and contacts prevents the possibility of producing quadrupoles in integrated circuit form for the purposes of reducing manufacturing costs and sizes.

Other test quadrupoles for telephone subscriber lines are disclosed in U.S. Pat. No. 3,843,848. Each of these quadrupoles also comprises a relay which, when activated, controls first and second series contacts on the line leads respectively in order to disconnect the subscriber installation and the second line section; here again, faults in the second line section at the subscriber installation end are not taken into consideration.

The activation of test quadrupoles as per U.S. Pat. No. 3,843,848 requires an alternating current trigger signal generator with a predetermined frequency at the remote test end. The quadrupole which comprises solely current detecting means or solely voltage detecting means must include a circuit which has a predetermined inductance and a predetermined capacitance and which is tuned to the predetermined frequency. This requirement generates various distorsions around the predetermined frequency, especially in regard of the impedance, the attenuation and the group propagation time in the line. The distortions are detrimental to the data signals should be subscriber line be digital. In view of the fact that current subscriber lines are for the most part intended in the short term for transmitting digital signals through a modem, the use of this type of quadrupole is very limited.

Moreover, the quadrupoles in U.S. Pat. No. 3,843,848 includes an alternating voltage or current detecting means containing a band pass amplifier and a Schmitt trigger for energizing the relay. A predetermined test tone frequency generator terminates the first line section when the relay is activated in response to the predetermined current or voltage. The generator and Schmitt trigger require a local supply that can be furnished by a battery, needing periodic renewal, or a pair of auxiliary supplying wires that can be accidentally cut.

OBJECTS OF THE INVENTION

With this state of the art in mind, it is a general object of this invention to minimize or eliminate the above-described drawbacks.

Another object of this invention is to provide a test system by means of which not only breaks in a two-lead line but also short circuits between the line leads and ground leaks with respect to each of the line leads can be located.

Another object of this invention is to provide a test device without ground reference.

Another object of this invention is to provide a test device which does not include a local supply source and in which voltage limiting and supplying means are supplied with energy from the applied activation voltage or current.

Another object of this invention is to provide a test quadrupole for which the connection order of its terminal pairs to the two-line leads is of no importance; the leads can be crossed over.

Another object of this invention is to provide a test device which need not be disconnected from the load circuit or subscriber installation linked to the second line section during fault location in the line.

Another object of this invention is to provide a test device which does not comprise relays and correspondent relay contacts; the test device can take the form of an integrated circuit.

Yet another object of this invention is to eliminate any cross-talk disturbance in other lines included in the same cable as the tested line when a test device is inserted in a line of the cable.

A further object of this invention is to provide a test device which is transparent to the digital signals likely to be transmitted by a telephone subscriber two-lead line.

SUMMARY OF THE INVENTION

These objects are accomplished in accordance with the test system of this invention, one embodiment of which comprises a test quadrupole which is connected in a two-lead line, in combination with supply means connectable to a remote end of said line across a switching facility for selectively applying a predetermined voltage across the two line leads and a predetermined current flowing in at least one of the two line leads. frequency detecting means connectable to said remote end of said line detects first and second predetermined frequencies.

The test quadrupole comprises voltage detecting means connected across the line leads. The voltage detecting means supplies to the line a signal having the first predetermined frequency that modulates line current in response to detection of the applied predetermined voltage, i.e., the modulating line current is applied to the line when there is no break in the line section between the remote supplying means and the test quadrupole. The test quadrupole includes current detecting means connected in series with one of the line leads. The current detector supplies to the line a signal having the second predetermined frequency that modulates line current in response to detection of the applied predetermined current, i.e. the second frequency modulating line current is applied to the line when no short circuit is between the two-line leads or when no ground shunt in the line section is between the remote supplying means and the test quadrupole is present.

The remote supplying means applies a relatively high voltage, e.g. a hundred or so volts, to the line leads to test the insulation between the line leads. As a result of fault locating and distinction between faults through detection of different predetermined frequencies, several test devices embodying the invention can be connected in the line and, consequently, assist in accurately indicating the position of the fault that must be repaired by the maintenance team. This distinction may also be made by assigning predetermined activation voltage and/or current thresholds in the test devices that can emit response signals at same first and second frequencies. In this case, depending on the voltage or current value applied, the test apparatus operator deduces the location of the fault from the comparison of the applied values with those to which the devices are to respond.

A test device embodying the invention can include first and second current detecting means that are respectively in series with the first and second line leads. The different response frequencies transmitted by these two current detecting means enable a solid ground to be distinguished between one or the other of the line leads.

According to another aspect of this invention, the current detecting means comprises predetermined resistances and/or thermistors connected between terminals of the detecting means. The resistances provide a practical means of providing a constant low ohmic value regardless of the line utilization mode. A test device can thus be used for any type of currently existing two-lead transmission line such as those that do not transmit DC current in operation. These are, for instance, special-purpose or data transmission lines. On a more general basis, a test device of the invention can be connected in any two-lead line with no concern for the use of the line.

More particularly, the voltage and current thresholds can be chosen such that they suit the operation of telephone lines in all known telephone networks, even networks having varying characteristics, as occur in different countries.

BRIEF DESCRIPTION OF THE DRAWING

The foregoing and other objects, features and advantages of the invention will be apparent from the following more particular description of preferred embodiments of the invention as illustrated in the accompanying drawings, in which:

FIG. 1 is a schematic block diagram of a test system embodying the invention;

FIG. 2 is a schematic block diagram of a complete test quadrupole or device embodying the invention;

DESCRIPTION OF THE PREFERRED EMBODIMENTS

Figure 3:
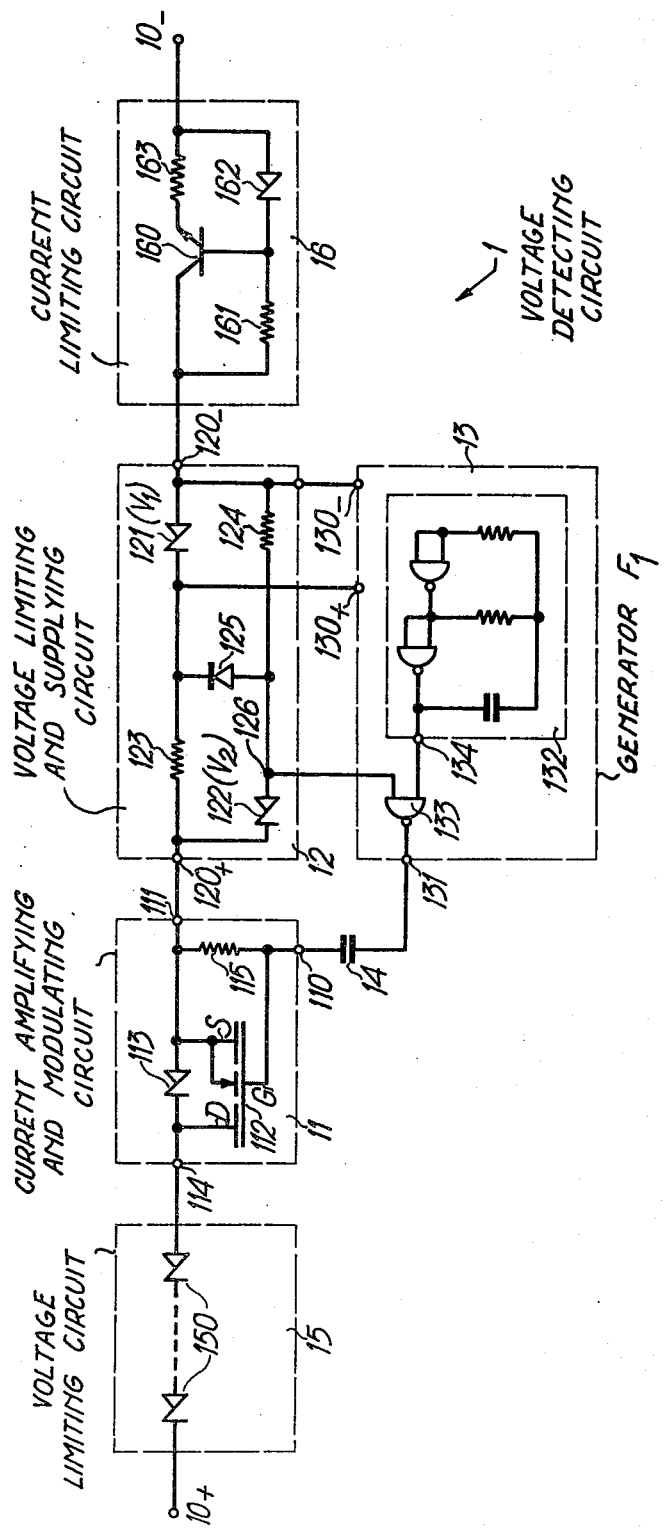
FIG. 3 is a detailed block diagram of a voltage detecting circuit in the test quadrupole.

Depicted in FIG. 1 is a preferred example of how a test quadrupole Q embodying the invention is used. This use relates to monitoring a telephone subscriber line or loop containing either coaxial or a two lead line or conductive wires $L_1$, $L_2$ having first ends $e_1$, $e_2$ connected to a corresponding trunk of a switching facility, such as a local telephone exchange E, and having second ends $i_1$, $i_2$ connected to input terminals of a telephone subscriber installation I; more generally ends $i_1$, $i_2$ are connected to a load circuit, such as a private automatic branch exchange (P.A.B.X.) having several extension stations.

The quadrupole Q is a test device which is connected in line L, usually in an easily accessible position, such as the coupling point of line sections in an underground pit or to a connection point where the line is coupled to the input of the telephone subscriber installation. The quadrupole thus devides the line L into two line sections. The first line section on the switching facility E side is connected to first terminals $qe_1$ and $qe_2$ of the quadrupole which are assigned to the line leads $L_1$ and $L_2$ respectively. The second line section on the installation I side is connected to second terminals $qi_1$ and $qi_2$ of the quadrupole that are assigned to the line leads $L_1$ and $L_2$ respectively.

At the line terminals $E_1$, $E_2$ in the switching facility E, a conventional switching circuit S is provided of the type, for instance, with relays which, when testing for location of line faults, enables line L to be disconnected from the switching facility E and to connect a test apparatus TA to the line L.

The test apparatus TA is preferably portable and goes hand in hand with a conventional test desk or test rack (not shown) that exists in every switching facility. The test desk enables a subscriber line which is served by the switching facility to be selected and determined parameters, such as outside voltages in the line leads and insulation resistances, to be measured, or line continuity tests to be carried out. The test apparatus TA houses all the means which are required for activating the test quadrupole and for detecting the signals delivered from the quadrupole, in relation to the two types of fault to be located, namely a break and a short circuit in line.

FIG. 2 is an overall block diagram of a preferred embodiment of a complete test quadrupole or device Q. Device Q comprises a voltage detecting circuit 1 and two current detecting circuits $2_1$ and $2_2$.

The role of voltage detecting circuit 1 is to locate line breaks. Because circuit 1 is biased, it is connected across the diagonal of a rectifying bridge which comprises, in a well known manner, four diodes $D_{11}$, $D_{12}$, $D_{21}$ and $D_{22}$. The bridge makes it possible to free circuit from the polarity of the voltages applied between the line leads $L_1$ and $L_2$ by the test apparatus TA; in other words, the order in which the line leads are connected to the quadrupole is of little significance. For a positive voltage between the first lead $L_1$ and the second lead $L_2$, the diode $D_{11}$ that is interconnected to the lead $L_1$ and a positive terminal 10+ of circuit 1, and the diode $D_{12}$ that is interconnected to a negative terminal 10− of circuit 1 and the second leads $L_2$, are forward biased while the other diodes $D_{11}$ and $D_{12}$ are reverse biased. Reciprocally, the diode $D_{21}$ that is interconnected to the second lead $L_2$ and positive terminal 10+ and the diode $D_{22}$ that is interconnected to the negative terminal 10− and the first lead $L_1$ are forward biased while the other two diodes $D_{11}$ and $D_{12}$ are reverse biased when the potential on the lead $L_2$ is greater than that on the lead $L_1$.

Current detecting circuits $2_1$, $2_2$ are used to locate short circuits in the line. Circuits $2_1$, $2_2$ are respectively in series with lead lines $L_1$, $L_2$, between the quadrupole terminals $qe_1$ and $qi_1$, $qi_2$, and $qe_2$, to locate the short circuits on the respective lead lines $L_1$, $L_2$; exemplary of the short circuits are a straight ground shunt of this lead and a shunt between this lead and an interference voltage source.

Test devices which include a voltage detecting circuit 1 with a rectifying bridge embodying the invention and/or one or two current detecting circuits $2_1$, $2_2$ embodying the invention, come within the scope of this invention.

VOLTAGE DETECTING CIRCUIT

In reference to FIG. 3, a description is given of a preferred embodiment of voltage detecting circuit 1. It comprises in particular a current amplifying and modulating circuit 11, a voltage limiting and supplying circuit 12 and a generator 13 which generates a first predetermined frequency. Circuit 12 acts as a voltage source for generator 13. Circuits 11 and 12 are in series between terminals 10+ and 10− of voltage detecting circuit 1.

Voltage limiting and supplying circuit 12 is made up of first and second voltage stabilizing circuits, which are connected in parallel between a positive terminal 120+ and a negative terminal 120− of circuit 12. The first and second stabilizing circuits respectively comprise Zener diodes 121, 122 and resistors 123, 124 which are series-connected and have in common a diode 125 which is connected in the median arm of circuit 12. Terminal 120+ feeds the cathode of Zener diode 122 and a terminal of resistor 123. Terminal 120− feeds the anode of Zener diode 121 and a terminal of resistor 124.

Frequency generator 13 comprises a conventional relaxation oscillator 132, such as a two-step multivibrator that oscillates at a first frequency $F_1$, and a NAND gate 133. One input of gate 133 is connected to the output 134 of the oscillator 132. The control input 126 of gate 133 is linked to the anodes of the Zener diode 122 and the common diode 125 and to the other terminal of the resistor 124. The positive supply terminal 130+ and the negative supply terminal 130− of the generator 13 are connected to the cathode and anode of the Zener diode 121, respectively. The cathode of Zener diode 121 is linked to the other terminal of resistor 123 and to the cathode of common diode 125.

The Zener diode 121 of the first voltage stabilizing circuit sets a first voltage limit $V_1$ for the frequency generated by supply 13. For supply voltages lower than the threshold voltages $V_1$, oscillator 132 is unstable. Zener diode 122 of the second voltage stabilizing circuit sets a second voltage limit $V_2$ which affects opening of NAND gate 133 when oscillator 132 is stable such that output 131 delivers the first frequency $F_1$ a control terminal 110 of the circuit 11 via a coupling circuit. The coupling circuit includes a series capacitor 14 typically having a capacitance of 10 nF; alternatively the coupling circuit can be an electrical isolation circuit (not shown) of the optoelectronic cell type, e.g. with a photoemissive diode L.E.D. and a photosensitive element.

When locating breaks, a so-called break locating voltage $V_b$ is applied to first terminals $E_1$, $E_2$ of line L by a voltage source that is housed in the test apparatus TA and is preferably adjustable. When the potential at terminal 10+ of voltage detecting circuit 1 increases, a small current flows through circuit 12 and the oscillator 132 is unstable. Next, with gate 133 remaining closed, oscillator 132 becomes stable and oscillates at the first frequency $F_1$ as soon as the voltage at the Zener diode 121 terminals reaches the threshold $V_1$. Lastly, when the voltage of supply $V_b$ increases aroud one volt, gate 133 opens following a sufficient potential at connection point 126, thus allowing the first frequency $F_1$ signal to be transmitted from oscillator 132 to terminal 110 of circuit 11. Common diode 123 enables the rise in voltage in 126 to be limited to the positive supply voltage derived from generator 13 and contributes to protecting gate 133 against any high voltage by the current from Zener diode 122 mandatorily passed to Zener diode 121 via diode 125. In this way, gate 133 is opened once the applied voltage $V_b$ is equal to the sum of the threshold voltages of diodes 122, 125 and the 121 and threshold voltages of circuits 15, 11 and 16 that are included in the voltage detecting circuit 1 and that are described hereinafter. In practice, the reverse threshold voltages (reverse knee voltages) $V_1$, $V_2$ of Zener diodes 121 and 122 are equal to 5.1 volts and 3.3 volts and the resistance of resistors 123 and 124 are equal to 500 ohms.

Current amplifying and modulating circuit 11 fulfils two functions. The first function is to amplify the first-frequency $F_1$ signal which is applied to its control terminal 110 and is coupled to transistor 112. The second function is to modulate the current that flows through voltage detecting circuit 1 from terminal 10+ to terminal 10− at the frequency $F_1$ in response to the voltage at terminal 110.

Transistor 112 can have an enhancement mode operation MOS structure with a n-type conductivity channel. The gate G of the transistor 112 is fed by the frequency $F_1$ signal received at terminal 110. In circuit 11, the voltage-current amplitude modulation is carried out by short circuiting a shunt Zener diode 113 which is connected between the drain D and the source S of MOS transistor 112. The drain D and the source S constitute the input 114 and output 111 of the circuit 11 respectively. The output terminal 111 is connected to the terminal 120+ of the circuit 12. The reverse threshold voltage of Zener diode 113 is equal to 24 volts in practice and imposes the desired amplitude of the frequency $F_1$ signal which is derived by circuit 1. Circuit 11 further comprises a bias resistor 115 having a high resistance of approximately 100 kohms that is interconnected between the gate G, or terminal 110, and the source S, or terminal 111, of transistor 112.

Voltage detecting circuit 1 further comprises two circuits 15 and 16 that respectively (1) isolate circuits 11 and 12 to prevent a normal working service current from flowing until such time as the voltage applied to terminals 10+ and 10− is no longer less than a voltage threshold $VT_1$ and (2) protect the circuit 1 against high currents. They determine the test voltage that is to be applied to the line.

Voltage limiting circuit 15 makes the test quadrupole a transparent in normal operation of line L. As shown in FIG. 3, circuit 15 includes a series of Zener diodes 150 between terminals 10+ and 114, each having a reverse threshold voltage equal to 24 volts. Zener diodes 150 number seven, for example, in order to provide under all circumstances a parallel resistance decidedly higher than that of the line L during operation.

Current limiting circuit 16, an overcurrent protector analogous to a voltage regulator-follower, comprises an NPN bipolar transistor 160 having a high breakdown voltage. a base voltage stabilizing circuit for transistor 160 comprises (1) a base resistor 161 connected between the base and the collector of the transistor 160 and to the output terminal 120− of the circuit 12, and (2) a Zener diode 162 that has a reverse threshold voltage equal for instance to 39 volts to limit the amplitude of the current passing through circuit 1. The emitter of the transistor 160 is connected to terminal 10− and to the anode of Zener diode 162 via an emitter resistor 163 of some 3 kohms.

For the numerical values of the components in circuit 1 indicated above, the variation in the applied break locating voltage $V_b$ is such that, for $V_b < VT_1 \simeq 180$ volts, no current flows between terminals 10+ and 10−, and for $V_b > VT_2 \simeq 230$ volts, the first frequency $F_1$ signal is fed by oscillator 132 to control terminal 110 of circuit 11 and modulates the current passing through circuit 1. The components of oscillator 132 are chosen for oscillation at a frequency $F_1 \simeq 9.8$ kHz for example.

OPERATION OF THE VOLTAGE DETECTING CIRCUIT

As long as the voltage applied to the test quadrupole terminals, i.e. terminals 10+ and 10− of circuit 1, is less than the threshold value $VT_1$ which corresponds in particular to the case of the line L being in normal operation, circuit 1 is equivalent to a very high resistance and no current flows through it.

If the voltage between terminals 10+ and 10− lies between $VT_1$ and $VT_2$, a very low current of a few milliamperes passes through circuit 1 and the first frequency $F_1$ signal is not detected at station TA even though oscillator 132 oscillates at frequency $F_1$. The $F_1$ frequency is not coupled to line L and station TA since NAND gate 133 is closed.

In response to the voltage across terminals 10+ and 10− being equal to voltage $VT_2$, NAND gate 133 opens and feeds the control voltage signal at frequency $F_1$ to the gate G of the MOS transistor 112. Since Zener diode 113 is shunted when transistor 112 is turned on, the current flowing through terminals 10+ and 10− increases by a few milliamperes. When the voltage between terminals 10+ and 10− increases above $VT_2$, the current flowing through terminals 10+ and 10− rises without, however, exceeding a maximum value which is set by current limiting circuit 16. During the break remote-locating procedure for the line L, the voltage $V_b$ applied by the test device TD must be greater than $VT_2$.

Referring again to FIG. 1, if there is no break in the first line section between terminals $E_1$ and $qe_1$ and terminals $qe_2$ and $E_2$, the voltage $V_b$ applied to terminals $10+$ and $10-$ of circuit 1 activates oscillator $F_1$ so the oscillator derives the first frequency $F_1$ signal. A frequency detector, included in the test apparatus TA and tuned to the frequency $F_1$, detects the $F_1$ signal and signals the operator, by means, for instance, of a lit electroluminescent diode, that the break is located in the second line section between terminals $qi_1$, $qi_2$ and $i_1$, $i_2$ or in the subscriber installation I. The frequency detection in the test apparatus 1 can be achieved by listening for the signal $F_1$ in a loudspeaker or the receiver of a telephone set.

On a reciprocal basis, if there is a break in one of the leads in the first line section, circuit 1 is not activated when voltage $V_b$ is applied to line L. No signal $F_1$ is detected by the test apparatus TA, to indicate that the break is not located in the second line section.

CURRENT DETECTING CIRCUIT

Figure 4:
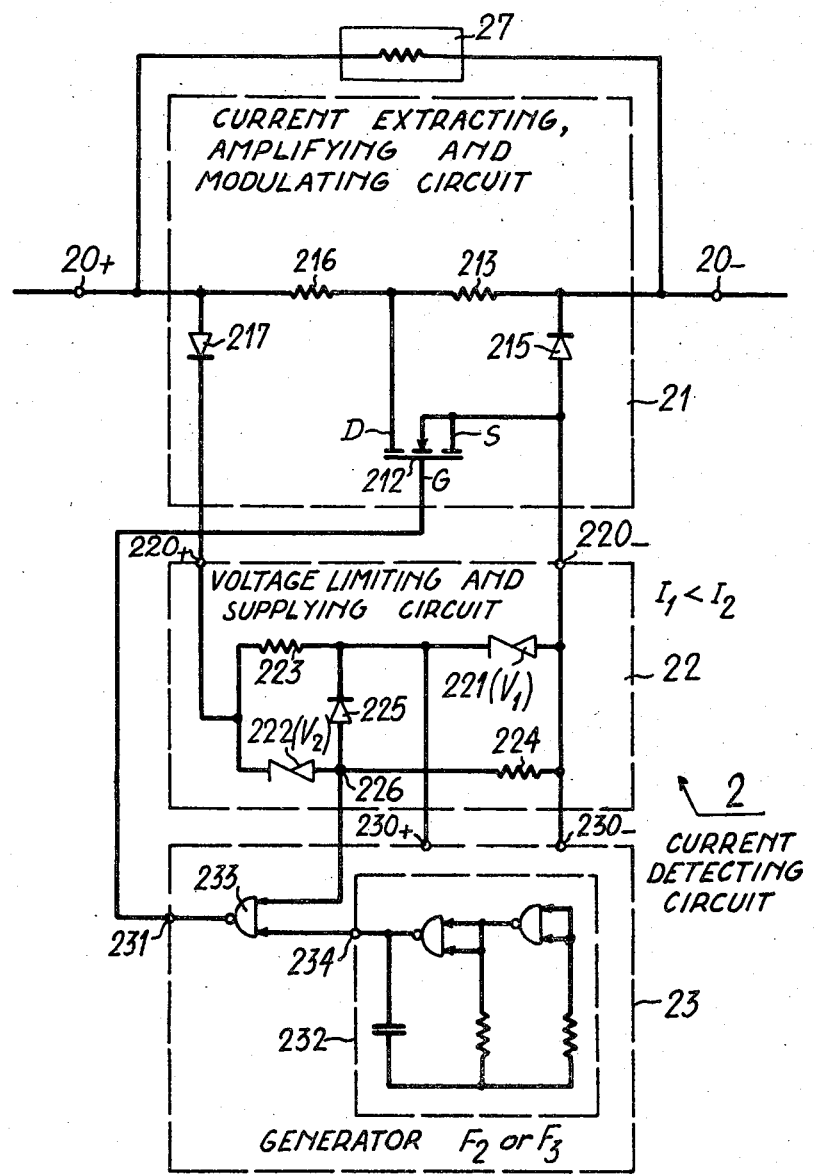
FIG. 4 is a detailed block diagram of a current detecting circuit in the test quadripole.

Referring to FIG. 4, a current detecting circuit 2 is series-connected as a dipole on line lead $L_1$ or $L_2$. Circuit 2 comprises a current extracting, amplifying and modulating circuit 21, a voltage limiting and supplying circuit 22 and a second frequency generator 23.

The lay-outs of the components in circuits 22 and 23 are identical to those of circuits 12 and 14 of voltage detecting circuit 1 illustrated in FIG. 3. Each component in circuits 22 and 23 is marked in FIG. 4 with reference numerals having a units digit which is the same as that of the corresponding component in circuits 12 and 13, FIG. 3.

Voltage limiting and supplying circuit 22 also introduces first and second voltage thresholds that correspond, for detecting the current in circuit 2, to first and second current thresholds $IT_1$ and $IT_2$ such that $IT_1 < IT_2$. Circuit 22 includes positive input terminal $220+$ and negative output terminal $220-$ between which circuit 22 is connected. Circuit 22 comprises first and second stabilizing circuit that respectivelty set voltage limits $V_1$ and $V_2$. The first stabilizing circuit is composed of a Zener diode 221 and a resistor 223 that have the same respective functions as components 121 and 123 in circuit 12. The second stabilizing circuit is composed of a Zener diode 222 and a resistor 224 that have the same respective functions as components 122 and 124 in circuit 12. A diode 225, common to the two stabilizing circuits, is connected in the diagonal arm of circuit 22 to prevent the voltage at the terminal 226 from becoming higher than the voltage at the supply terminal $230+$ of the frequency generator 23. The cathode and anode of Zener diode 221 are respectively connected to the positive and negative supply terminals $230+$ and $230-$ of a two-step multivibrator-type oscillator 232 of frequency generator 23. A NAND gate 233 is included in generator 23 in an analogous fashion to NAND gate 133 in generator 13 (FIG. 3). In other words, one of the inputs of gate 233 is connected to the anodes 226 of diodes 222 and 225 and to a terminal of the resistor 224. The other input of NAND gate 233 is connected to the output 234 of the oscillator 232.

Current detecting circuit 2 further comprises current extracting, amplifying and modulating circuit 21 which fulfils the same role as circuit 11 in the voltage detecting circuit 1 and which comprises, like the latter, an MOS transistor 212. The transistor 212 has an enhancement mode operation structure with an n-type conductivity channel. The other components in circuit 21 and the lay-outs thereof differ from those in circuit 11.

As shown in FIG. 4, between the positive input terminal $20+$ and the negative output terminal $20-$ of the amplifying and modulating circuit 21, that constitute the terminals of the current detecting circuit 2, are included two series-connected resistors 216 and 213. Second resistor 213 is interconnected to the drain D of MOS transistor 212 and by a diode 215 to the source S of MOS transistor 212 and consequently is shunted by this transistor 212. In FIG. 4, the gate G of MOS transistor 212 is connected directly to the output 231 of NAND gate 233. Alternatively gate G of transistor 212 is indirectly connected to output terminal 231 by a coupling circuit, such as the capacitor 14 in FIG. 3. Circuit 21 further comprises a diode 217 having an anode that is forward biased by a positive voltage at terminal $20+$; the cathode of diode 217 is connected to input terminal $220+$ of circuit 22. Circuit 21 also includes diode 215 having a cathode connected to negative terminal $20-$. Diodes 217 and 215 protect circuit 22, which supplies frequency generator 23 with a power supply voltage from line L, against a current applied in the opposite direction, i.e. from negative terminal $20-$ to positive terminal $20+$.

In a preferred embodiment, the components in circuit 12 and 22 are respectively identical to reduce manufacturing costs of the test quadrupole Q. While oscillators 132 and 232 preferably have identical structures, they include components having differing values such that the first and second frequencies $F_1$ and $F_2$ differ. Thereby, by detecting the frequencies of signals transmitted by circuits 1 and 2 it is possible to distinguish between a break and a short circuit in line at the test apparatus TA end (FIG. 1). The test apparatus TA can thus include a second frequency detector which is tuned to the second frequency $F_2$ or a common frequency detecting circuit having a frequency band encompassing at least two frequencies $F_1$ and $F_2$; such a detector is similar to a receiver of a handset of a typical telephone set. The second frequency $F_2$ may have a value equal to 8.3 kHa.

OPERATION OF CURRENT DETECTING CIRCUIT

The sum of the resistances of resistors 216 and 213 in amplifying and modulating circuit 21 when connected in series in the respective line lead $L_1$ or $L_2$ is sufficiently small so as not to disturb the load circuit I in normal operation. In a preferred embodiment, resistors 216 and 213 have resistances equal to 33 and 12 ohms respectively. The voltage limit $V_1$ stabilizes the oscillations in oscillator 232 and the voltage limit $V_2$ delays the second frequency $F_2$ signal as it is coupled to gate G of transistor 212 until such time as oscillator 232 has become stable. Since an additional voltage increase at terminal 226 occurs by increasing the test current across terminals $20+$ and $20-$, NAND gate 233 can then be opened to enable transistor 212 to modulate the applied current and shunt the resistor 213. The value of the minimum current $IT_2$ which corresponds to the minimum direct current value $I_S$ applied by the adjustable voltage source of the test apparatus TA, is then reached for the short circuits to be located. The current threshold $IT_2$ depends on the resistance of the line L which is equal to one kohm for a telephone line.

Referring again to FIG. 1, a short circuit or line loop with respect to the test quadruple Q by activating test apparatus TA so it applies a direct current $I_s$ equal to or generally greater than the afore-mentioned minimum current $IT_2$.

If the short circuit lies beyond the test quadrupole Q, i.e. in the second line section $qi_1-qi_2$ to $i_1-i_2$ or in the load circuit I, the direct current $I_s$ passes through current detecting circuit 2 and activates the second frequency generator 23. The second frequency $F_2$ signal is detected in the test apparatus TA.

In the contrary condition, if no direct current $I_s$ flows through the current detecting circuit 2 and consequently the second frequency $F_2$ signal is not derived by generator 23, the test apparatus TA does not detect any signal. This corresponds to a short circuit located in the first line section between the terminals $F_1$, $E_2$ of the switching facility S and the terminals $qe_1$, $qe_2$ of the test quadrupole Q.

According to a further embodiment, the current detecting circuit 2 as depicted in FIG. 4, includes a semiconductive thermistor 27 that is interconnected across the terminals 20+ and 20− of circuit 2 and that is therefore in parallel with series-connected resistors 215 and 213. The thermistor 27 is a resistor which has a known positive temperature coefficient (PTC) and which is made of a semiconductive ferro-electric ceramic material. Thermistor 27 has a characteristic curve-temperature-dependent resistance—which introduces a switching threshold having an ohmic value lying between the slowly decreasing negative temperature coefficient region and the quickly increasing positive temperature coefficient region which corresponds to a current greater than the line loop (or closing) current values experienced in service. In the absence of any locating procedure, thermistor 27 short circuits the amplifying and modulating circuit 21 and the supplying circuit 22 and as a corollary to this imposes a voltage drop when working as compared to the previous embodiment. Moreover, in the presence of the thermistor 27, the resistors 216 and 213 preferably have high resistances, thus enabling a reduction in the current which is applied by the test apparatus TA during short circuit location procedure.

In further embodiments one or even both of resistors 216 and 213 can be replaced by positive temperature coefficient thermistors, such as the thermistor 27 defined above.

As already pointed out, a complete test device embodying the invention includes two current detecting circuits $2_1$ and $2_2$ in series along the respective line leads $L_1$, $L_2$. To distinguish between short circuits caused by direct grounding in leads $L_1$ and $L_2$, circuits $2_1$ and $2_2$ transmit second and third frequencies $F_2$ and $F_3$ that are different in value.

A test system embodying this invention generally comprises several test devices, in proportion to the line length and accessibility positions along the line. To make a distinction between the locations of faults along the line sections which are interconnected between the test devices, the frequencies $F_1$, $F_2$, $F_3$ for each device and/or the voltage and current thresholds $VT_2$ and $IT_2$ differ.

In a telephone subscriber line, for instance, at least two test devices can be introduced. The first of these is positioned in the vicinity of a local exchange or switching facility and the second in the vicinity of the subscriber installation. The interpretation of detecting differing frequencies or the same frequency in terms of the voltage applied by the test apparatus TA follows the same resoning for a break or a short circuit. If the first test device were not to respond correctly, the fault is located at the switching facility end. Should the first test device be activated normally and the second test device not transmit any signal, then the fault is located in the line. Lastly, if both test devices respond correctly, then the fault is located in the subscriber installation.

Furthermore, although the invention has been described in relation to a test system for a telephone subscriber loop, the operating principles of the system in accordance with the invention may equally well be applied to fault location in other circuits of the two-lead line type, one end of which is connected to an electronic circuit such as a measuring device, a data recording device or any similar equipment, which is, for instance, remotely controlled from a central unit through the line.

Systems coming within the spirit and scope of the invention such as that described above, locate faults along any two-lead line of the telephone, telex or special-purpose type regardless of the load circuit which is served by the line.

The scope of the invention further covers the different test devices considered separately.

What is claimed is:

1. A test system for locating breaks and short circuits in a two-lead line comprising:
  a test quadrupole connected in said line at a position to divide the line into first and second line sections;
  supplying means selectively connected to one end of said first line section for applying either (a) a predetermined voltage between said two leads or (b) a predetermined current to at least one of said leads; and
  frequency detecting means connectable to said one end of said first line section for detecting first and second predetermined frequencies;
  said test quadrupole comprising:
  voltage detecting means connected between said line leads for supplying to the line a signal having said first frequency and for modulating current in the line, said voltage detecting means being responsive to said applied predetermined voltage, said voltage detecting means including first supply means for deriving a first power supply voltage when the line is supplied with the predetermined voltage by said applied voltage, first generating means activated by the first power supply voltage for generating said first frequency signal, and first modulating means in series with said first power supply voltage deriving means for modulating the current flowing through said voltage detecting means with said first frequency signal derived by said first generating means; and
  current detecting means connected in series with one of said line leads for supplying to said line a signal having said second frequency and modulating line current, said current detecting means being responsive to said applied predetermined current, said current detecting means including second supply means for deriving a second power supply voltage when the line is supplied with the predetermined current by said applied current, second generating means activated by the second power supply voltage for deriving said second frequency signal and second modulating means in parallel with said second power supply means for modulating the current flowing through said current detecting means with said second frequency signal derived by said second generating means.

2. A test system as claimed in claim 1 further comprising other current detecting means connected in series along the other line lead for transmitting along said line a signal having a third frequency and for modulating the line current in response to said applied current; and
said frequency detecting means includes means for detecting said third frequency.

3. A test system as claimed in claim 1 or 2 wherein said frequencies are different.

4. A test system as claimed in claim 1 or 2 wherein said frequency detecting means comprises a receiver of a telephone set.

5. A test system as claimed in claim 1 or 2 wherein several test quadrupoles are connected in said two-lead line, each of the quadrupoles having different activating voltages and currents.

6. A test system as claimed in claim 1 or 2 wherein several test quadrupoles are connected in said two-lead line, each of the quadrupoles deriving a different frequency.

7. A test device adapted to be connected between two leads of a two-lead line for locating breaks in said line, an end of said line being selectively connected to supply means for applying a voltage across said two line leads, the applied voltage being higher than a first predetermined voltage threshold, the end of the line being selectively connected to frequency detecting means for detecting at least one predetermined frequency, said test device comprising:
voltage limiting and supplying means adapted to be connected to the line so as to be activated to generate a supply voltage in response to said applied voltage being applied across said two lines;
means for generating a signal having said predetermined frequency in response to the supply voltage generated by said limiting and supplying means; and
means connected in series with said voltage limiting and supplying means for modulating the current flowing through said test device with said predetermined frequency signal derived by said generating means.

8. A test device as claimed in claim 7 wherein said voltage limiting and supplying means comprises a first Zener diode interconnected to energize power supply terminals of said generating means, a first resistor-series-connected with the first Zener diode.

9. A test device as claimed in claim 7 or 8 wherein said voltage limiting and supplying means includes means responsive to the supply voltage for controlling opening of a logic gate for transferring said predetermined frequency signal to said current modulating means in response to an applied voltage higher than a second voltage threshold, said generating means oscillating at said predetermined frequency in response to the applied voltage being higher than said first voltage threshold which is less than said second voltage threshold.

10. A test device as claimed in claim 9 wherein the voltage limiting and supplying means comprises in series a second Zener diode and a second resistor that are connected in parallel with said first Zener diode and first resistor, and a diode having an anode connected to an anode of said second Zener diode and to a control input of said logic gate, the simple diode having a cathode connected to the cathode of said first Zener diode.

11. A test device as claimed in claim 8 wherein the voltage limiting and supplying means comprises in series a second Zener diode and a second resistor that are connected in parallel with said first Zener diode and first resistor, and a diode having an anode connected to an anode of said second Zener diode and to a control input of said logic gate, the simple diode having a cathode connected to the cathode of said first Zener diode.

12. A test device as claimed in claim 7 wherein said generating means comprises a multivibrator designed to oscillate at said predetermined frequency.

13. A test device as claimed in claim 7 wherein said current modulating means comprises a transistor having a control electrode responsive to said predetermined frequency signal and having two other electrodes connected to selectively short circuit a Zener diode connected in series with said voltage limiting and supplying means.

14. A test device as claimed in claim 13 wherein said transistor has an enhancement mode operation MOS structure with an n-type conductivity channel.

15. A test device as claimed in claim 7 further including an optoelectronic coupling means for coupling said generating means to said current modulating means.

16. A test device as claimed in claim 7 further including a capacitor for coupling said generating means to said current modulating means.

17. A test device as claimed in claim 7 further comprising Zener diodes connected in series between terminals of the test device.

18. A test device as claimed in claim 7 or 17 comprising current limiting means with a predetermined current threshold connected in series between terminals of the test device.

19. A test device as claimed in claim 18 wherein said current limiting means includes a resistor and a Zener diode connected in series between terminals of the limiting means, a terminal between the resistor and Zener diode of the limiting means being connected to a control electrode of a transistor having two other electrodes connected in a DC series circuit with said terminals of said current limiting means, the DC series circuit including a resistor in series with the other two electrodes.

20. A test device as claimed in claim 7 further including a rectifying diode bridge having first and second terminals respectively connected to said two line leads and third and fourth terminals forming a diagonal in which the test device is connected.

21. A test system comprising several test devices as claimed in claim 7, each of the test devices being connected across said two-lead line and having different activating voltages.

22. A test system comprising several test devices as claimed in claim 7 or 21, each of the test devices being connected across said two-lead line and deriving different frequencies.

23. A test device adapted to be connected in series in one lead of a two-lead line for locating short circuits in said line, an end of said line being selectively connected to supply means for applying a current to at least one of said leads, the applied current being higher than a first current threshold, the end of the line being selectively connected to frequency detecting means for detecting at least a predetermined frequency, said test device comprising:

voltage limiting and supplying means adapted to be connected to the line so as to be activated to generate a supply voltage in response to said applied current being applied to said lead;

means for generating a signal having said predetermined frequency in response to the supply voltage generated by said voltage limiting and supplying means; and means connected in parallel with said voltage limiting and supplying means for modulating the current flowing through said current detecting means with said predetermined frequency signal derived by said generating means.

24. First and second test devices as claimed in claim 23 connected in series along said two line leads, said first and second test devices respectively supplying to said line first and second signals having different predetermined frequencies and modulating said line current in response to said applied current being coupled to the line.

25. A test device as claimed in claim 23 wherein said voltage limiting and supplying means comprises a first Zener diode interconnected to energize power supply terminals of said generating means, a first resistor series-connected with the first Zener diode.

26. A test device as claimed in claim 23 or 25 wherein said voltage limiting and supplying means includes means responsive to the supply voltage for controlling opening of a logic gate for transferring said predetermined frequency signal to said current modulating means in response to an applied current higher than a second current threshold, said generating means oscillating at said predetermined frequency in response to the applied current being higher than said first current threshold which is less than said second current threshold.

27. A test device as claimed in claim 26 wherein said voltage limiting and supplying means comprises in series a second Zener diode and a second resistor that are connected in parallel with said first Zener diode and first resistor, and a simple diode having an anode connected to the anode of said second Zener diode and to a control input of said logic gate, the simple diode having a cathode connected to the cathode of said first Zener diode.

28. A test device as claimed in claim 25 wherein said voltage limiting and supplying means comprises in series a second Zener diode and a second resistor that are connected in parallel with said first Zener diode and first resistor, and a simple diode having an anode connected to the anode of said second Zener diode and to a control input of said logic gate, the simple diode having a cathode connected to the cathode of said first Zener diode.

29. A test device as claimed in claim 23 wherein said generating means comprises a multivibrator designed to oscillate at said predetermined frequency.

30. A test device as claimed in claim 23 wherein first and second terminals of said voltage limiting and supplying means are respectively connected by first and second forward biased diodes to positive and negative terminals of said test device.

31. A test device as claimed in claim 23 wherein said current modulating means comprises a transistor having a control electrode connected to be responsive to said predetermined frequency signal, the transistor having two other electrodes connected to shunt a resistor between the first and second terminals of said current detecting means.

32. A test device as claimed in claim 31 wherein said second diode is connected to the shunted resistor and to a negative electrode of said transistor.

33. A test device as claimed in claim 31 wherein said transistor has an enhancement mode operation MOS structure with an n-type conductivity channel.

34. A test device as claimed in claim 31 wherein said current modulating means includes another resistor series-connected with said shunted resistor between the first and second terminals of said current detecting means.

35. A test device as claimed in claim 31 or 34 further comprising a positive temperature coefficient resistor connected in parallel between first and second terminals of the test device.

36. A test device as claimed in claim 34 wherein at least one of said resistors of said current modulating has a positive temperature coefficient.

37. A test device as claimed in claim 23 further including optoelectronic coupling means for coupling said generating means to said current modulating means.

38. A test device as claimed in claim 23 further including a capacitor for coupling said generating means to said current modulating means.

39. A test device as claimed in claim 23 or 24 wherein said frequency detecting means comprises a receiver of a telephone set.

40. A test system comprising several test devices as claimed in claim 23 or 24, each of the test devices being connected in series with one of said line leads and having different activating currents.

41. A test systems comprising several test devices as claimed in claim 23 or 24, each of the test devices being connected in series with one of said line leads and deriving a different frequency.

* * * * *